May 29, 1934.  H. L. KNAPP  1,961,121
OIL PAN
Filed July 5, 1932
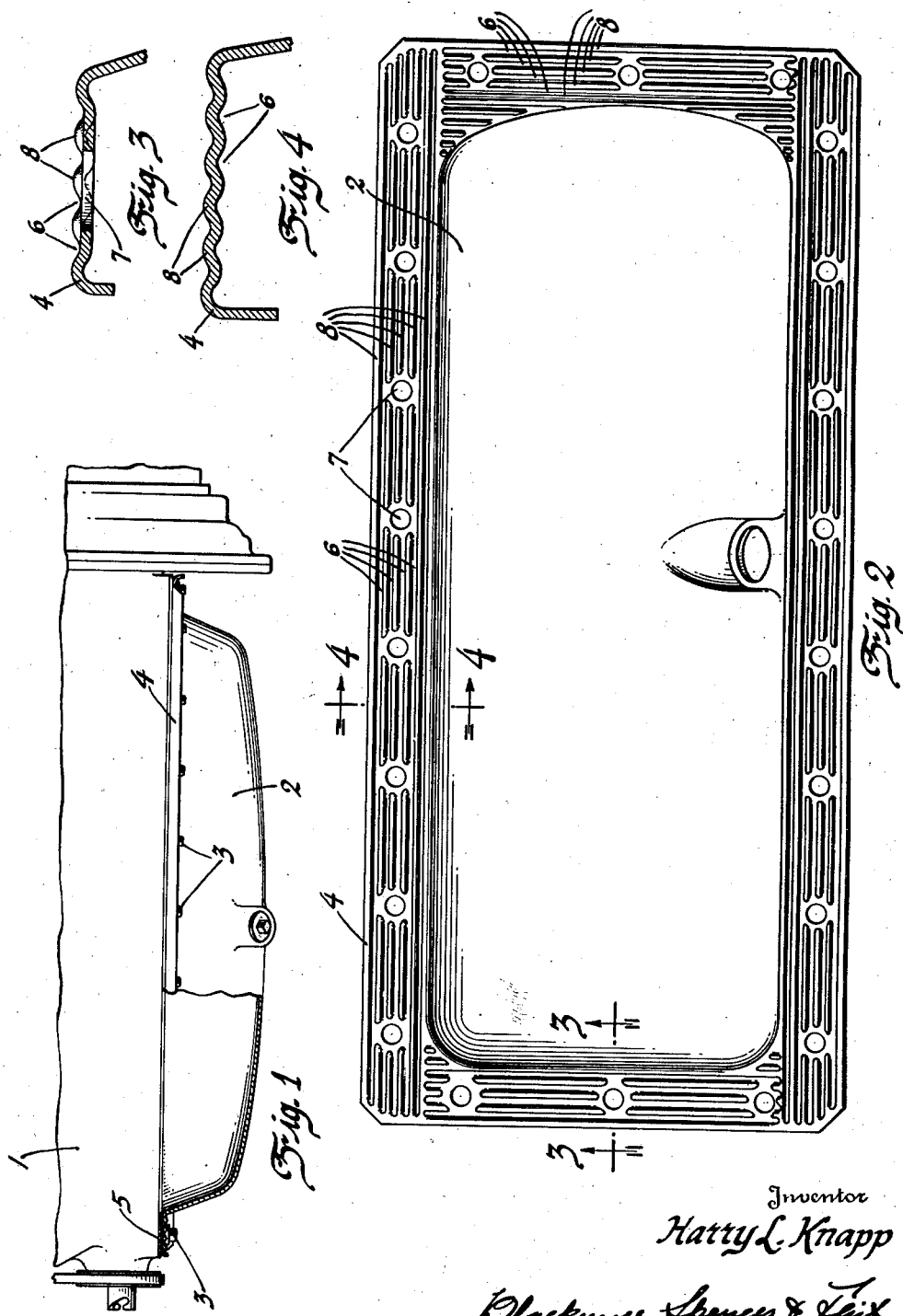
Inventor
Hatty L. Knapp
By Blackmore, Spencer & Faix
Attorneys Patented May 29, 1934

1,961,121

UNITED STATES PATENT OFFICE 1,961,121

OIL PAN

Harry L. Knapp, Royal Oak, Mich.

Application July 5, 1932, Serial No. 620,837

2 Claims. (Cl. 220—46)

It is an object of the present invention to provide an improved seal between two parts that are clamped together.

To illustrate the type of joint to which the invention is particularly applicable, reference will be made herein to the mounting of an oil pan or cover on the crankcase of an internal combustion engine. The same type of joint is to be found in various other associations, as for example, in the motor vehicle art, at the circular cover cap for the differential mechanism in the rear axle; the cover for the valve operating gear, etc.

The invention will be best understood upon reference to the accompanying drawing wherein Figure 1 is a fragmentary side elevation of the lower portion of an engine with parts in section, Figure 2 is a top plan view of the oil pan shown in Figure 1, and Figures 3 and 4 are sectional views taken on line 3—3 and line 4—4, respectively, of Figure 2.

Referring to the drawing, the crankcase of the engine is indicated by the numeral 1, having on its underside an oil pan 2, secured in place by a series of removable bolts or studs 3, projecting through the rim or peripheral flange 4 of the oil pan into screw threaded engagement with the crankcase 1 and placing pressure on the gasket 5 interposed between the oil pan flange and the crankcase.

The greatest pressure exerted upon the compressible packing or gasket 5 is in the region of the fastening bolts or studs 3, and unless the studs are closely spaced and the pan stamped from relatively heavy sheet metal, leakage will occur between the studs. With this in mind it is here proposed to provide the flange 4 with a series of longitudinally extending grooves or depressions 6, some of which are located between the bolt openings 7 and others of which extend throughout substantially the whole flange. This transverse succession of depressions or grooves 6 provides a series of alternately arranged raised portions or ridges 8, as best shown in Figures 3 and 4, which raised portions make advance contact with the compressible gasket and serve to concentrate the clamping pressure at transversely spaced intervals over the face of the gasket and thereby afford a better and more secure seal than is had when the pressure is distributed uniformly over the entire area. Furthermore, the undulations serve to materially strengthen the flange, particularly throughout the portions between the bolt openings so that the clamping pressure is more nearly uniform throughout the length of the contacting parts. In addition, the reinforcement provided allows the bolts to be spaced farther apart than usual and also permits the use of a much lighter sheet of metal from which the pan is formed, which not only reduces cost of material but also the cost of manufacture, since the thinner gage material is much easier to work.

I claim:

1. In a construction wherein two parts are to be clamped together with an interposed sealing gasket therebetween, one of the parts comprising a pressed metal cover having a peripheral attaching rim, said rim having a series of spaced openings therein for the passage of attachment bolts, and a series of stiffening ribs pressed out of the plane of the rim, certain of the ribs extending continuously throughout the rim and beside the bolt openings and other of the ribs occupying the rim area between said openings.

2. In a construction wherein two parts are to be clamped together with an interposed sealing gasket therebetween, one of the parts comprising a pressed metal cover having a peripheral attaching rim, said rim having a series of spaced openings therein for the passage of attachment bolts, and a series of stiffening ribs pressed out of the plane of the rim in the rim area between said bolt openings.

HARRY L. KNAPP.